United States Patent
Takano

(10) Patent No.: US 10,178,269 B2
(45) Date of Patent: Jan. 8, 2019

(54) INFORMATION PROCESSING SYSTEM

(71) Applicant: FUJI XEROX CO., LTD., Tokyo (JP)

(72) Inventor: Kentaro Takano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/800,982

(22) Filed: Nov. 1, 2017

(65) Prior Publication Data
US 2018/0213113 A1  Jul. 26, 2018

(30) Foreign Application Priority Data

Jan. 20, 2017 (JP) ................................. 2017-008873

(51) Int. Cl.
G06F 3/01 (2006.01)
G06F 1/16 (2006.01)
H04N 1/32 (2006.01)

(52) U.S. Cl.
CPC ......... *H04N 1/32368* (2013.01); *G06F 1/163* (2013.01); *G06F 3/011* (2013.01); *G06F 3/016* (2013.01)

(58) Field of Classification Search
CPC ........... G06F 1/163; G06F 3/011; G06F 3/016
See application file for complete search history.

(56) References Cited

U.S. PATENT DOCUMENTS

| 2011/0157052 A1* | 6/2011 | Lee ........................ G06F 1/1626 345/173 |
| 2011/0210931 A1* | 9/2011 | Shai ........................ G06F 3/014 345/173 |
| 2013/0207792 A1* | 8/2013 | Lim ........................ G06F 3/011 340/407.1 |
| 2015/0277559 A1* | 10/2015 | Vescovi .................. G06F 3/014 345/173 |
| 2017/0018150 A1* | 1/2017 | Kim ........................ G07C 9/00 |
| 2017/0168630 A1* | 6/2017 | Khoshkava ............. G06F 1/163 |

FOREIGN PATENT DOCUMENTS

| JP | H08-249344 A | 9/1996 |
| JP | 2006-171945 A | 6/2006 |

* cited by examiner

*Primary Examiner* — Lixi C Simpson
(74) *Attorney, Agent, or Firm* — Oliff PLC

(57) ABSTRACT

An information processing system includes a display unit, a detector, plural vibration sources, and a vibration controller. The display unit displays a document on a display screen. The detector detects an operation by an operator on the document displayed on the display screen. The plural vibration sources deliver vibrations to different parts of the operator. The vibration controller performs control to selectively vibrate the plural vibration sources in accordance with contents of the operation detected by the detector.

12 Claims, 12 Drawing Sheets

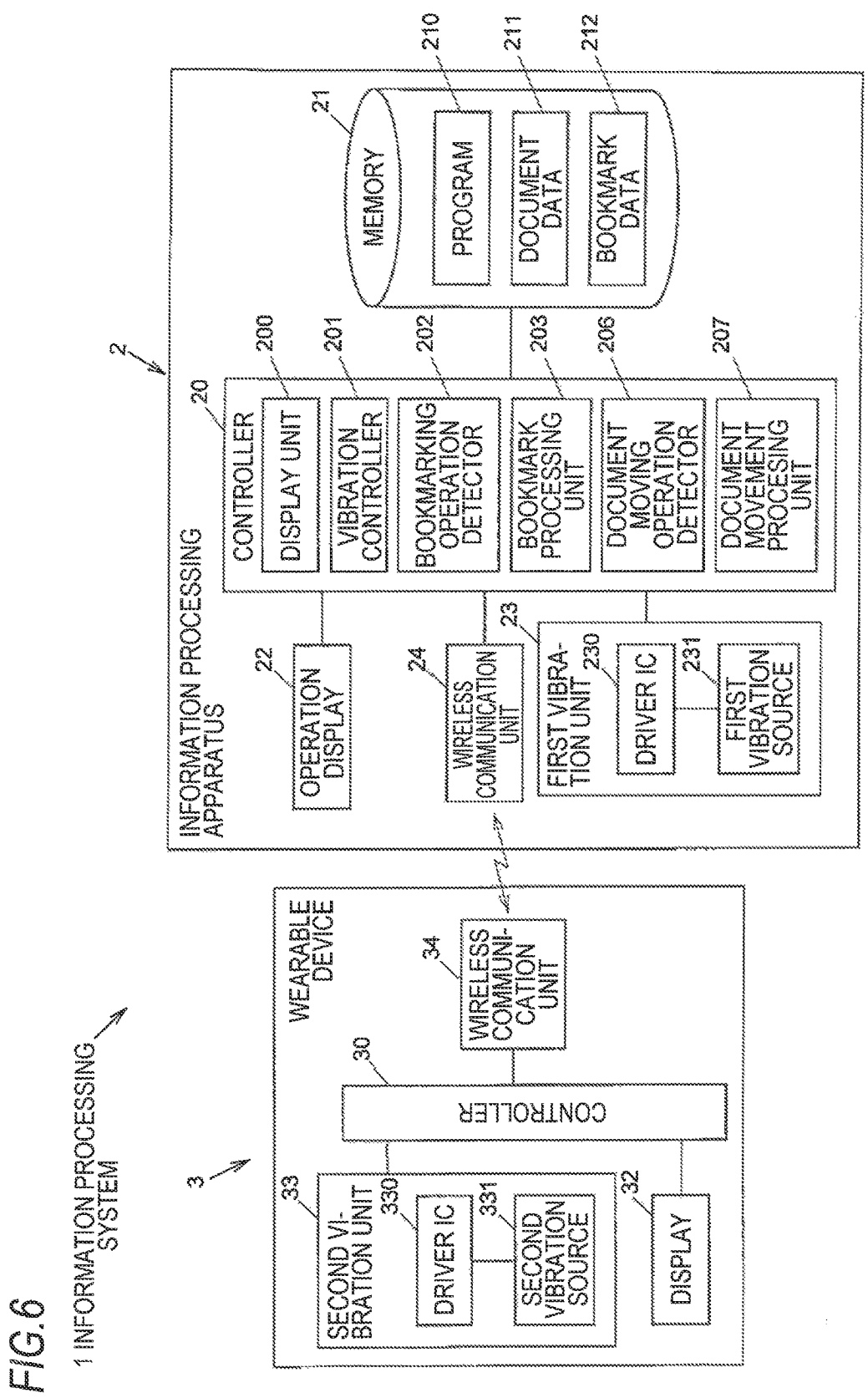

INFORMATION PROCESSING SYSTEM

CROSS-REFERENCE TO RELATED APPLICATIONS

This application is based on and claims priority under 35 USC 119 from Japanese Patent Application No. 2017-008873 filed Jan. 20, 2017.

BACKGROUND

Technical Field

The present invention relates to an information processing system.

SUMMARY

According to an aspect of the invention, an information processing system includes a display unit, a detector, plural vibration sources, and a vibration controller. The display unit displays a document on a display screen. The detector detects an operation by an operator on the document displayed on the display screen. The plural vibration sources deliver vibrations to different parts of the operator. The vibration controller performs control to selectively vibrate the plural vibration sources in accordance with contents of the operation detected by the detector.

BRIEF DESCRIPTION OF THE DRAWINGS

Exemplary embodiments of the present invention will be described in detail based on the following figures, wherein:

FIG. 6 is a block diagram illustrating an example of a control system of an information processing system according to a second exemplary embodiment of the present invention;

DETAILED DESCRIPTION

Figure 1:
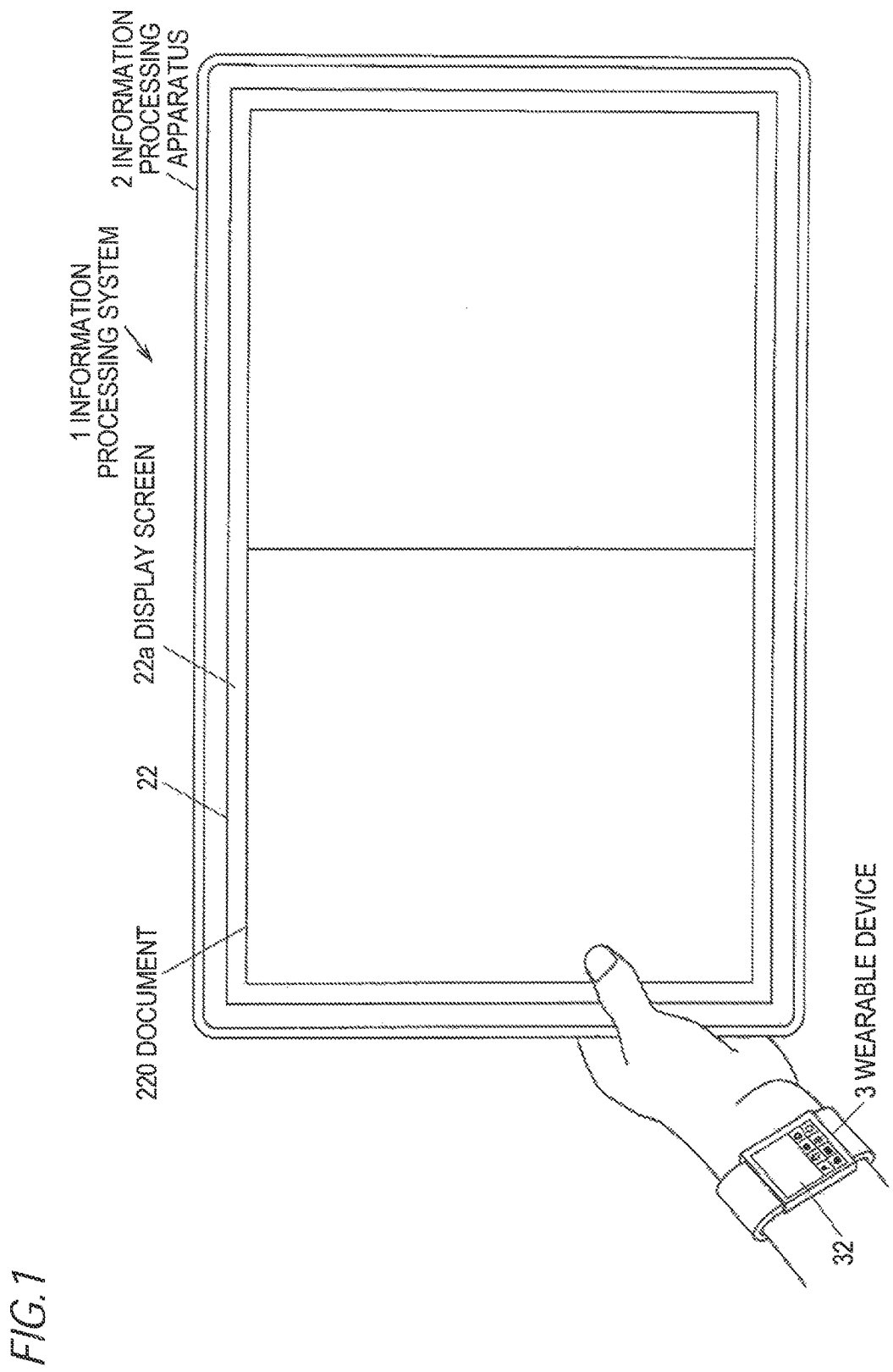
FIG. 1 is a schematic view illustrating a configuration example of an information processing system according to a first exemplary embodiment of the present invention.

Hereinafter, exemplary embodiments of the present invention will be described with reference to the drawings. Throughout the drawings, elements having substantially the same functions are denoted by the same reference numerals and explanation of which will not be repeated.

[Outline of Exemplary Embodiments]

An information processing system according to the present exemplary embodiment of the present invention includes a display unit, a detector, plural vibration sources, and a vibration controller. The display unit displays a document on a display screen. The detector detects an operation by an operator on the document displayed on the display screen. The plural vibration sources deliver vibrations to different parts of the operator. The vibration controller performs control to selectively vibrate the plural vibration sources in accordance with contents of the operation detected by the detector.

The plural vibration sources may include a first vibration source provided in the information processing apparatus having the display screen and a second vibration source provided in a wearable device worn by the operator. The number of the vibration sources may be three or more. Examples of the vibration sources may include a piezoelectric element, an eccentric motor, a linear vibrator, and the like. Among these elements, the piezoelectric element has a short response time (for example, 1 ms), the vibration frequency of the piezoelectric element may be controlled over a wide range (for example, 50 to 300 Hz), and the amplitude of the piezoelectric element is variable.

The selective vibration of the plural vibration sources may include vibrating two or more vibration sources simultaneously in addition to vibrating one vibration source. The vibration controller may change one or both of the vibration frequency and the vibration amplitude of the vibration sources according to the contents of the operation. Such change may be made step by step. The vibration may be continuously or intermittently delivered to the operator according to the contents of the operation.

The information processing apparatus is, for example, a tablet type personal computer or a multifunctional mobile phone (smart phone).

The wearable device is, for example, a wrist-wearable electronic device worn on the operator's wrist, a finger-wearable electronic device worn on the operator's finger, an arm-wearable electronic device worn on the operator's arm, or a glove-shaped electronic device worn on the operator's hand so as to cover the entire hand over the fingers, palm and back of the hand. The number of wearable devices may be one or two or more.

The document is electronic data and may be a document including characters, figures, images, moving images, voices, and the like.

The display screen is not limited to an actual display screen of the information processing apparatus but may be a virtual display screen formed in a virtual space. For example, a document in a virtual space may be displayed and a wearable device may be worn on both hands of the operator.

The operation on the document includes a first operation for changing a display position of the document and a second operation for instructing a display position of the document. The display position may include the coordinates of a position on the display screen where the document is displayed, a page number of a displayed page, and the like.

The first operation may include an operation by the operator of advancing a page currently displayed on the display screen to a next page, an operation by the operator of returning the current page to a previous page, an operation by the operator of moving a display position of the document on the display screen, and the like. The second operation may include, for example, an operation by the operator of temporarily putting a mark on a page in interest.

First Exemplary Embodiment

FIG. 1 is a schematic view illustrating a configuration example of an information processing system according to a first exemplary embodiment of the present invention.

The information processing system 1 includes an information processing apparatus 2 having a function of displaying a document 220 and delivering a vibration to an operator in response to an operation on the displayed document 220, and a wearable device 3 worn by the operator and having a function of delivering a vibration to the operator.

The information processing apparatus 2 includes an operation display 22 that displays the document 220 on a display screen 22a and receives an operation from the operator on the document 220 displayed on the display screen 22a.

The wearable device 3 is, for example, a wrist-wearable smart watch having a clock function and includes a display 32 that displays time and the like.

In the present exemplary embodiment, for the convenience of explanation, a case where the operator wears the wearable device 3 on the left hand and operates the information processing apparatus 2 with the right hand will be described as an example. It should be noted that the exemplary embodiments of the present invention are not limited to this example. The left hand and the right hand of the operator are examples of different parts of the operator to whom a vibration source delivers a vibration.

Figure 2:
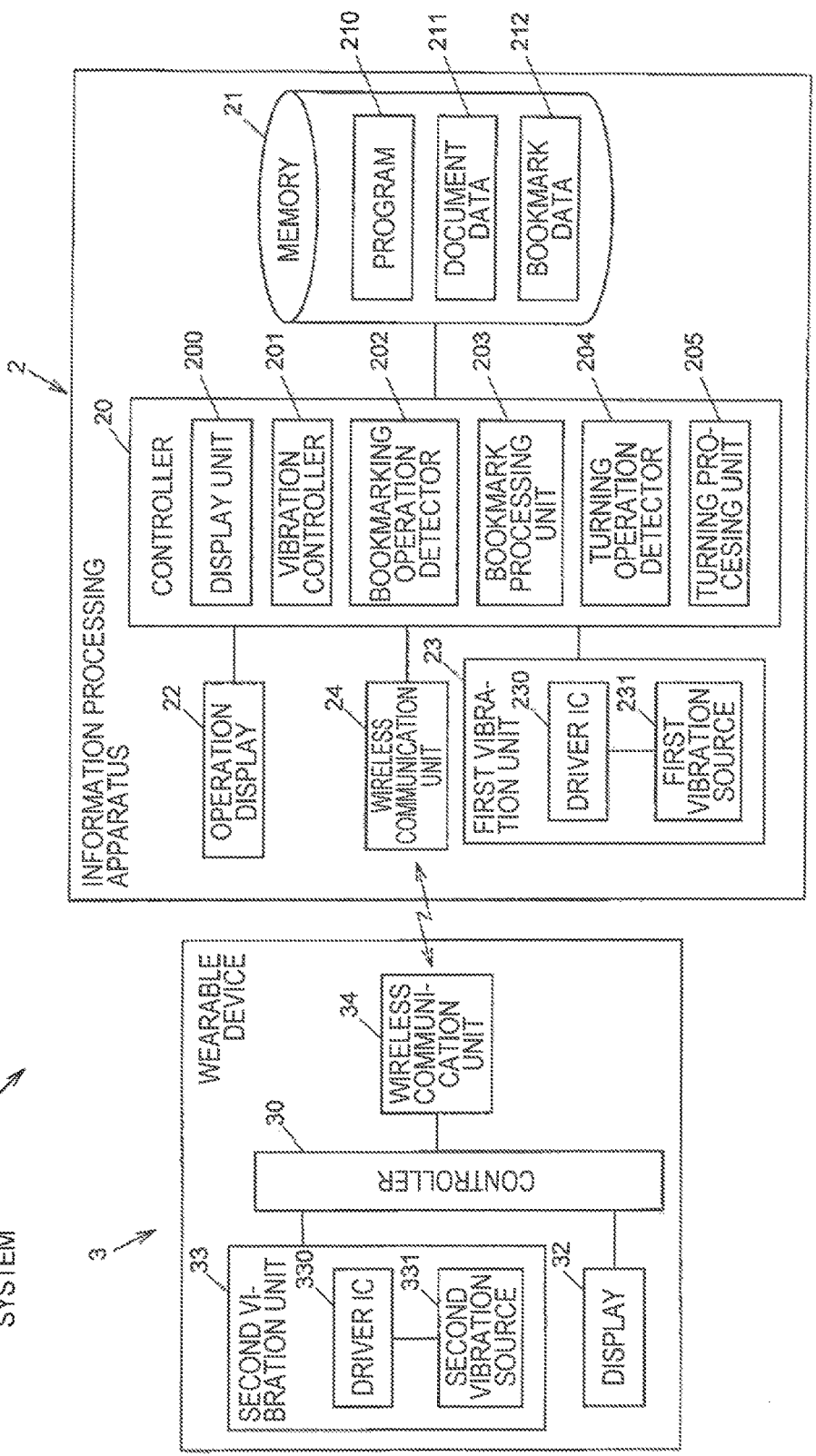
FIG. 2 is a block diagram illustrating an example of a control system of the information processing system illustrated in FIG. 1.

FIG. 2 is a block diagram illustrating an example of a control system of the information processing system 1 illustrated in FIG. 1. The information processing system 1 includes the information processing apparatus 2 and the wearable device 3 connected to the information processing apparatus 2 via wireless communication.

(Configuration of Information Processing Apparatus)

As illustrated in FIG. 2, the information processing apparatus 2 includes a controller 20 that controls the information processing apparatus 2, a memory 21 that stores various data, the operation display 22, a first vibration unit 23 including a first vibration source 231 that delivers a vibration to the information processing apparatus 2, and a wireless communication unit 24 that wirelessly communicates with the wearable device 3.

The controller 20 of the information processing apparatus 2 is configured with a central processing unit (CPU), an interface, and the like. The controller 20 operates in accordance with a program 210 of the memory 21 (to be described later) to function as a display unit 200, a vibration controller 201, a bookmarking operation detector 202, a bookmark processing unit 203, a turning operation detector 204, a turning processing unit 205, and the like. Among these components, the bookmarking operation detector 202, the bookmark processing unit 203, the turning operation detector 204, and the turning processing unit 205 are examples of a detector that detects operations on the document 220. These components 200 to 205 will be described in detail later.

Figure 5:
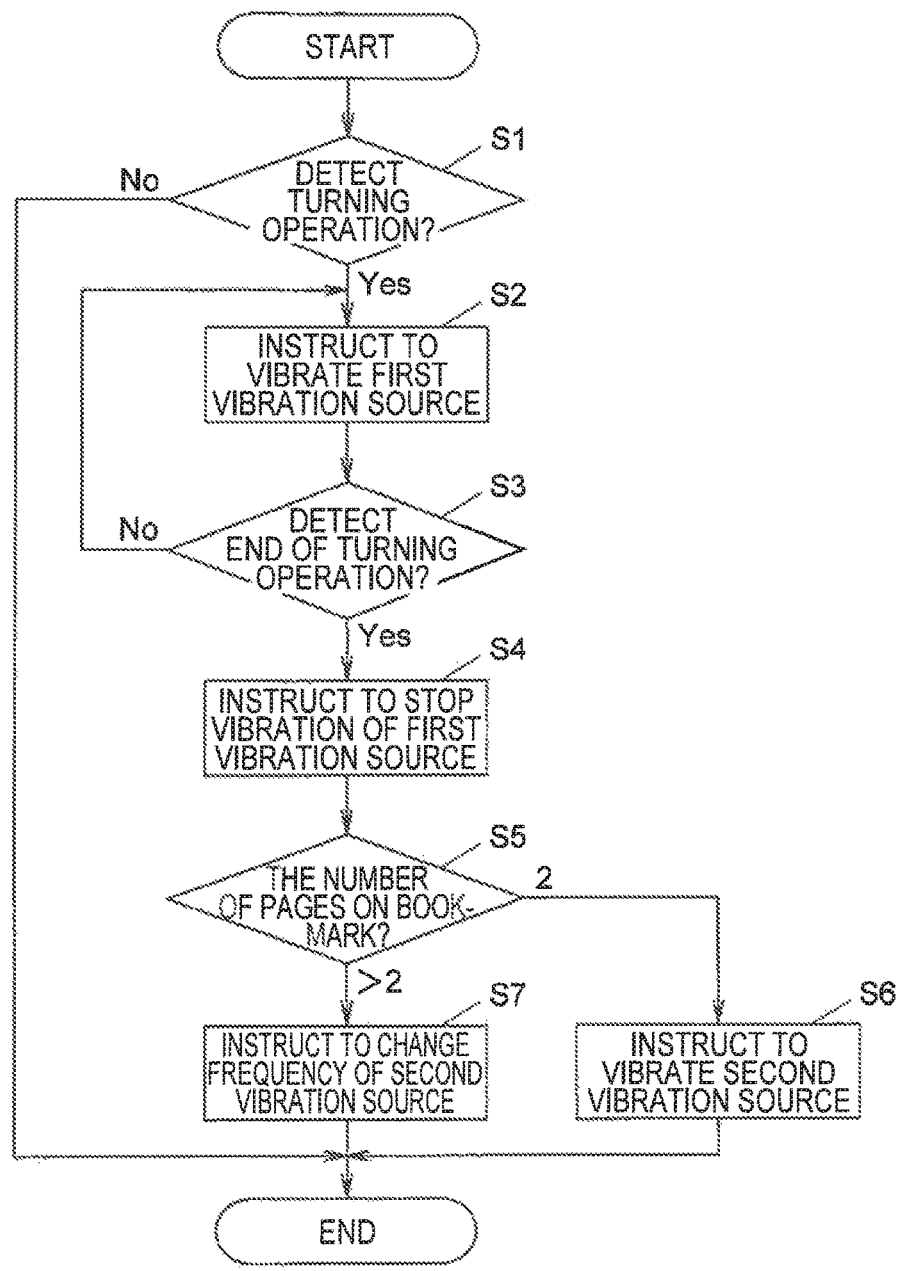
FIG. 5 is a flowchart illustrating an example of an operation of the information processing system illustrated in FIG. 1.

The memory 21 is configured with a read only memory (ROM), a random access memory (RAM), and the like and stores the program 210 as illustrated in a flowchart of FIG. 5, and various data such as document data 211 and bookmark data 212.

The document data 211 includes data of plural documents 220 each configured with plural pages. The bookmark data 212 includes a page number of a page displayed when the bookmarking operation detector 202 detects a finger bookmarking operation, and a page number of a currently displayed page.

As used herein, the term "finger bookmark" refers to a mark temporarily put on a page of interest by the operator. The finger bookmarking operation is an operation by the operator for temporarily putting a mark on a page of interest and is an example of the second operation for instructing a display position of the document 220.

The display unit 200 reads the document data 211 stored in the memory 21 and displays the document 220 related to the read document data 211 on the display screen 22a of the operation display 22.

The vibration controller 201 transmits an operation command signal for vibrating the first vibration source 231 in accordance with the contents of the operation detected by the detector to the first vibration unit 23 and stops the transmission of the operation command signal to the first vibration unit 23 in accordance with the contents of the operation detected by the detector.

In addition, the vibration controller 201 transmits an operation command signal for vibrating a second vibration source 331 in accordance with the contents of the operation detected by the detector to a controller 30 of the wearable device 3, and transmits an operation stop command signal for stopping the vibration of the second vibration source 331 in accordance with the contents of the operation detected by the detector to the controller of the wearable device 3. Further, the vibration controller 201 transmits a frequency change command signal for changing the vibration frequency of the second vibration source 331 in accordance with the contents of the operation detected by the detector to the controller 30 of the wearable device 3.

The bookmarking operation detector 202 detects the finger bookmarking operation performed by the operator on the document 220 displayed on the display screen 22a and an operation of releasing the finger bookmark. As used herein, the phrase "operation of releasing the finger bookmark" refers to an operation by the operator of returning a displayed page to a page on which a mark is put by the finger bookmarking operation.

The bookmark processing unit 203 stores in the memory 21 a page number of a page displayed when the finger bookmarking operation is detected by the bookmarking operation detector 202 (hereinafter, also referred to as a "mark page"). In addition, the bookmark processing unit 203 obtains a difference (hereinafter, also referred to as "the number of pages on the finger bookmark") between a page number of the currently displayed page and a page number of the mark page and stores this information in the memory 21. Further, when the bookmarking operation detector 202 detects the operation of releasing the finger bookmark, the bookmark processing unit 203 outputs the page number of the mark page to the display unit 200.

The turning operation detector 204 detects a turning operation of the document 220 performed by the operator on the document 220 displayed on the display screen 22a. As used herein, the term "turning operation" refers to an operation by the operator of advancing a page currently displayed on the display screen 22a to the next page and returning the currently displayed page to the previous page. The turning operation also includes an operation that the operator attempts to turn a page but does not turn over the page. The turning operation is an example of the first operation for changing the display position of the document 220. Further, the turning operation detector 204 detects the end of the turning operation of the document 220 performed by the operator.

When the turning operation detector 204 detects the turning operation of the document 220, the turning processing unit 205 generates image information of the document 220 in a state where a page is being turned and dynamically outputs the generated image information to the display unit 200. When the end of the turning operation is detected, the turning processing unit 205 outputs a page number of the page displayed when the turning operation is completed, to the display unit 200.

The operation display 22 is, for example, a touch panel display and has a configuration in which a touch panel is superimposed on the front surface of a display such as a liquid crystal display.

The first vibration unit 23 includes the first vibration source 231 for delivering a vibration to the information processing apparatus 2, and a driver IC 230 for driving the first vibration source 231. Based on the operation command signal transmitted from the vibration controller 201 to the first vibration unit 23, the driver IC 230 outputs a drive signal to the first vibration source 231 to vibrate the first vibration source 231 at a predetermined frequency. Further, based on the stop of the transmission of the operation command signal from the vibration controller 201, the driver IC 230 stops the output of the drive signal to the first vibration source 231 to stop the vibration of the first vibration source 231.

The first vibration source 231 is, for example, a piezoelectric element and is provided inside the information processing apparatus 2. The first vibration source 231 is vibrated at a predetermined frequency by the drive signal output from the driver IC 230 to vibrate the entire information processing apparatus 2.

The wireless communication unit 24 uses Wi-F (Registered Trademark), BlueTooth (Registered Trademark), or the like to exchange signals with a wireless communication unit 34 of the wearable device 3 (to be described later).

(Configuration of Wearable Device)

The wearable device 3 includes the controller 30 that controls various parts of the wearable device 3, the display 32 that displays a clock, a second vibration unit 33 including the second vibration source 331 that delivers a vibration to the wearable device 3, and the wireless communication unit 34 that wirelessly communicates with the information processing apparatus 2.

The controller 30 of the wearable device 3 includes a central processing unit (CPU), an interface, and the like. The controller 30 operates in accordance with the program 210 of the memory 21 by a signal transmitted from the wireless communication unit 24 of the information processing apparatus 2 to the wireless communication unit 24 of the wearable device 3.

Specifically, based on the operation command signal transmitted from the vibration controller 201 and received via the wireless communication units 24 and 34, the controller 30 transmits an operation command signal for vibrating the second vibration source 331 to the second vibration unit 33. In addition, based on the operation stop command signal transmitted from the vibration controller 201, the controller 30 stops the transmission of the operation command signal to the second vibration unit 33. Further, based on the frequency change command signal transmitted from the vibration controller 201, the controller 30 transmits an operation command signal with a changed frequency to the second vibration unit 33. Further, the controller 30 acquires the current time and outputs the acquired current time to the display 32.

The second vibration unit 33 includes the second vibration source 331 for delivering a vibration to the wearable device 3, and a driver IC 330 for driving the second vibration source 331.

Based on the operation command signal transmitted from the controller 30, the driver IC 330 outputs a drive signal to the second vibration source 331 to vibrate the second vibration source 331 at a predetermined frequency. Further, based on the stop of the transmission of the operation command signal from the controller 30, the driver IC 330 stops the output of the drive signal to the second vibration source 331 to stop the vibration of the second vibration source 331.

The second vibration source 331 is, for example, a piezoelectric element and is provided inside the wearable device 3. The second vibration source 331 is vibrated at a predetermined frequency by the drive signal output from the driver IC 330 to vibrate the wearable device 3. In addition, the second vibration source 331 stops the vibration by stopping the output of the drive signal from the driver IC 330 based on the stop of the transmission of the operation command signal from the controller 30.

The wireless communication unit 34 uses Wi-Fi (Registered Trademark), BlueTooth (Registered Trademark), or the like to exchange signals with the wireless communication unit 24 of the information processing apparatus 2.

(Operation of First Exemplary Embodiment)

Next, an example of the operation of the information processing system 1 will be described with reference to FIGS. 3 to 5.

When the operator selects the document 220 from the plural pieces of document data 211, the display unit 200 reads the document data 211 selected by the operator and displays the document 220 on the display screen 22a. When the document 220 selected by the operator is to be activated for the first time, a cover page which is the first page of the document is displayed. When the document 220 has been activated in the past, a page displayed at the time of closing in the past may be displayed. In the present exemplary embodiment, for the convenience of explanation, an example of document data in which a two-page spread is displayed and the page number increases from the left side to the right side will be described, but the present invention is not limited to this example.

Figure 3A:
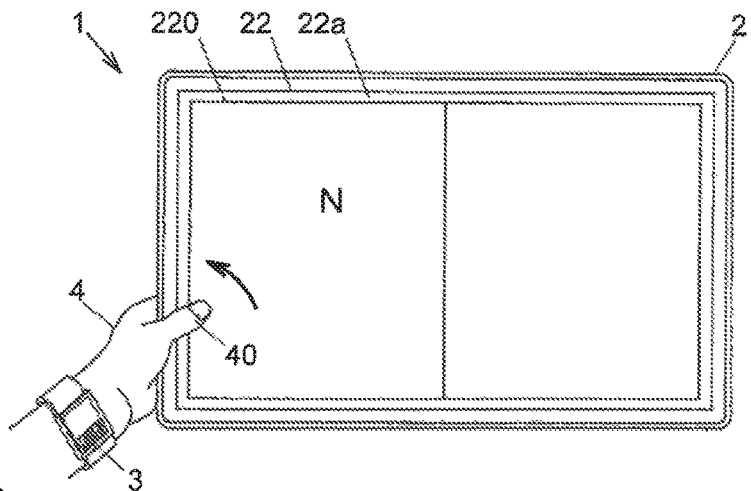
FIGS. 3A to 3C are views illustrating an example of an operation on a document in the information processing system illustrated in FIG. 1.
Figure 3B:
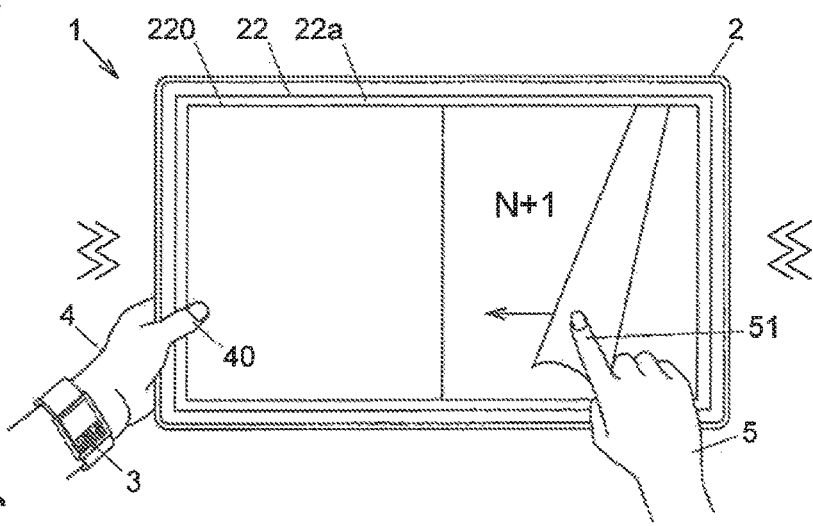
Figure 3C:
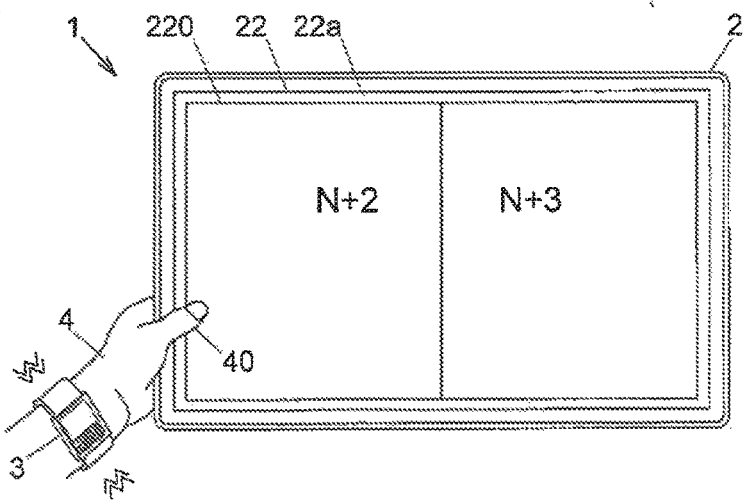

FIGS. 3A to 3C are views illustrating an example of the operation of the document 220 in the information processing apparatus 2. FIG. 3A illustrates a state immediately before the turning operation is started. FIG. 3B illustrates a state where the turning operation is being performed. FIG. 3C illustrates a state immediately after the turning operation is completed. The character (N) in the figures indicates a page number of a displayed page.

(1) Finger Bookmarking Operation

It is assumed that the operator performs a finger bookmarking operation on a page of concern in the document 220. The finger bookmarking operation is an operation by the operator of touching a predetermined area on the display screen 22a of the operation display 22 with the thumb 40 of the left hand 4 (the hand on the side where the wearable device 3 is worn) holding the information processing apparatus 2, and sliding the thumb 40 upwardly so as to draw an arc (see, for example, an arrow in FIG. 3A). The finger to be slid is not limited to the thumb but may be another finger.

When the operator performs the finger bookmarking operation, the bookmarking operation detector 202 detects the finger bookmarking operation and the bookmark processing unit 203 temporarily stores a page number of a mark page in the memory 21, as one of the bookmark data 212. Specifically, as illustrated in FIG. 3A, when the page number of a page displayed when the operator performs the finger bookmarking operation is "N", the "N" is stored in the memory 21, as the page number of the mark page.

(2) Turning Operation

Figure 4A:
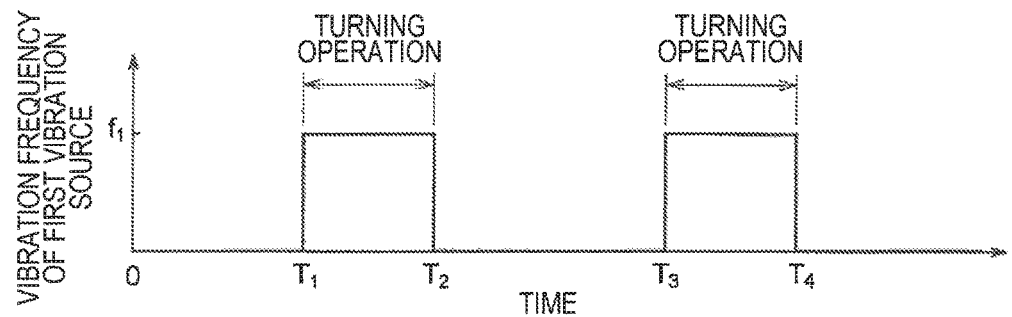
FIGS. 4A to 4C are timing charts illustrating an example of vibration of the information processing apparatus and vibration of a wearable device illustrated in FIG. 1.
Figure 4B:
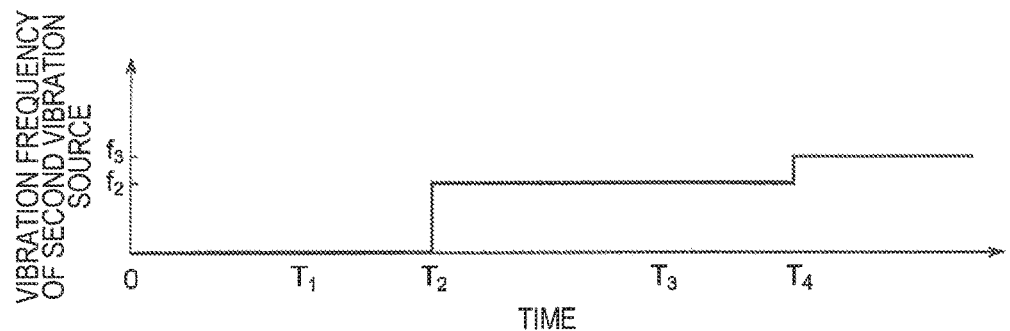
Figure 4C:
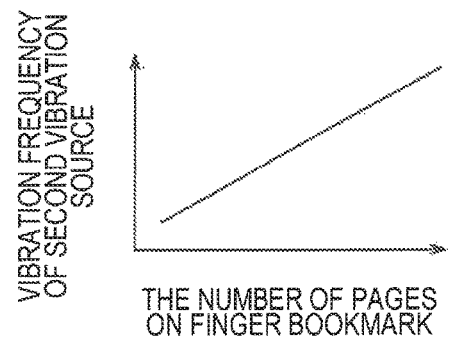

Next, the turning operation will be described with reference to FIGS. 4A to 4C and FIG. 5. FIGS. 4A to 4C are timing charts illustrating an example of the vibration frequency of a vibration source. FIG. 4A illustrates an example of the vibration frequency of the first vibration source 231. FIG. 4B illustrates an example of the vibration frequency of the second vibration source 331. FIG. 4C illustrates an example of the relationship between the number of pages on the finger bookmark and the vibration frequency of the second vibration source 331. In FIGS. 4A and 4B, the horizontal axis represents time and the vertical axis represents the vibration frequency. In FIG. 4C, the horizontal axis represents the number of pages on the finger bookmark and the vertical axis represents the vibration frequency of the second vibration source 331. FIG. 5 is a flowchart illustrating an example of the operation of the information processing system 1 illustrated in FIG. 1.

It is assumed that the operator performs a turning operation on the document 220 displayed on the display screen 22a in a state where the finger bookmarking operation is performed. For example, as illustrated in FIG. 3B, the turning operation is an operation by the operator of touching a predetermined area (for example, an area where the end of a page to be turned by the operator is displayed) on the display screen 22a with an index finger 51 of a right hand 5 (the hand on the side where the wearable device 3 is not worn) and sliding the touched index finger 51 so as to flip the finger toward one predetermined direction (for example, a direction from the end of a page to be turned by the operator to the opposite end of the page) (see, for example, an arrow in FIG. 3B). The finger to be slid is not limited to the index finger 51 but may be another finger.

When the operator performs the turning operation, the turning operation detector 204 detects the turning operation of the page ("Yes" in S1) and the turning processing unit 205 generates image information of the document 220 in a state where the page is being turned over according to the slide movement of the index finger 51, and dynamically outputs the generated image information to the display unit 200.

As illustrated in FIG. 3B, based on the image information output by the turning processing unit 205, the display unit 200 displays the document 220 in a state where the page is being turned over, on the display screen 22a of the operation display 22.

When the turning operation detector 204 detects the turning operation of the page ("Yes" in S1), the vibration controller 201 transmits an operation command signal to the first vibration unit 23, as an instruction to vibrate the first vibration source 231 (S2).

The first vibration source 231 is vibrated at a predetermined frequency according to a drive signal output from the driver IC 230 based on the operation command signal transmitted from the vibration controller 201. Specifically, as illustrated in FIG. 4A, assuming that the time at which the turning operation detector 204 detects the turning operation is time $T_1$, the first vibration source 231 starts to be vibrated at the predetermined frequency $f_1$ at the time $T_1$. This vibration continues until the end of the turning operation to be described later is detected ("Yes" in S3).

As the first vibration source 231 is vibrated, the entire information processing apparatus 2 is vibrated as illustrated in FIG. 3B. This vibration is delivered to the right hand 5 with which the operator touches the display screen 22a during operation.

(3) End of Turning Operation

When the page tuning is finished, the operator ends the turning operation. The turning operation is ended, for example, by the operator sliding the index finger 51 in touch with the display screen 22a beyond a predetermined distance and separating the index finger 51 from the display screen 22a.

When the operator ends the turning operation, the turning operation detector 204 detects the end of the turning operation ("Yes" in S3) and the turning processing unit 205 outputs the page number of a page displayed as the turning operation is completed, to the display unit 200. Specifically, when the operator advances the page forward, the page number of the next page is output to the display unit 200. When the operator returns the page to the previous page, the page number of the next page is output to the display unit 200.

As illustrated in FIG. 3C, based on the page number of the page output from the turning processing unit 205, the display unit 200 displays the document 220 in a state after the page is turned over, on the display screen 22a of the operation display 22.

When the turning operation detector 204 detects the end of the turning operation ("Yes" in S3), the vibration controller 201 stops the transmission of the operation command signal to the first vibration unit 23, as an instruction to stop the vibration of the first vibration source 231 (S4). The first vibration source 231 stops the vibration by stopping the output of the drive signal from the driver IC 230 based on the stop of the transmission of the operation command signal from the vibration controller 201. Specifically, as illustrated in FIG. 4A, assuming that the time at which the end of the turning operation is detected is time $T_2$, the first vibration source 231 stops the vibration at time $T_2$.

As the first vibration source 231 stops the vibration, the vibration of the entire information processing apparatus 2 stops as illustrated in FIG. 3C.

As described above, while the operator is performing the turning operation, the first vibration source 231 continues the vibration (see, for example, times $T_3$ and $T_4$ in FIG. 4A).

In addition, the bookmark processing unit 203 stores the number of pages on the finger bookmark in the memory 21, as the bookmark data 212. For example, as illustrated in FIGS. 3A and 3C, when the page number of the mark page on which the finger bookmarking operation has been performed by the operator is "N" and the page number currently displayed by the later turning operation by the operator is "N+2", a difference between the page numbers is 2. Accordingly, since the number of pages on the finger bookmark is 2, "2" is stored as the bookmark data 212 in the memory 21.

The bookmark processing unit 203 reads out the number of pages on the finger bookmark stored as the bookmark data 212 in the memory 21 (S5).

When the number of pages on the finger bookmark read by the bookmark processing unit 203 is "2" ("2" in S5), that is, when the operator turns a page for the first time after the finger bookmarking operation is performed, the vibration controller 201 transmits an operation command signal for vibrating the second vibration source 331, as an instruction to vibrate the second vibration source 331, to the controller 30 of the wearable device 3 via the wireless communication units 24 and 34 (S6).

The controller 30 transmits an operation command signal to the second vibration unit 33 based on the operation command signal transmitted from the vibration controller 201. The second vibration source 331 is vibrated at a predetermined frequency according to the drive signal output from the driver IC 330 based on the operation command signal transmitted from the controller 30. Specifically, as illustrated in FIG. 4B, the second vibration source 331 starts to be vibrated at a predetermined frequency $f_2$ at time $T_2$ and continues to be vibrated until an operation of releasing the finger bookmark (which will be described later) is detected. The start of the vibration of the second vibration source 331 is not limited to time $T_2$ at the end of the turning operation, but the second vibration source 331 may be gradually vibrated before turning the page over.

As the second vibration source 331 is vibrated, the wearable device 3 is vibrated as illustrated in FIG. 3C. This vibration is delivered to the left hand 4 on which the wearable device 3 is worn.

In the meantime, when the read number of pages on the finger bookmark is larger than "2" (">2" in S5), the second vibration source 331 starts to be vibrated by a turning operation performed by the operator before the earlier turning operation and this vibration continues. In this case, the vibration controller 201 transmits a frequency change command signal for changing the vibration frequency of the second vibration source 331, as an instruction to change the vibration frequency of the second vibration source 331, to the controller 30 of the wearable device 3 via the wireless communication units 24 and 34 (S7).

Based on the frequency change command signal transmitted from the vibration controller 201, the controller 30 transmits an operation command signal of the changed frequency to the second vibration unit 33. The second vibration source 331 changes the vibration frequency according to the drive signal output from the driver IC 330 based on the operation command signal transmitted from the controller 30 and continues the vibration with the changed vibration frequency. Specifically, the second vibration source 331 changes the vibration frequency to a frequency $f_2$ different from $f_1$ at time $T_4$ when the end of the second or subsequent turning operation is detected, and continues the vibration with the frequency $f_2$.

As the second vibration source 331 is vibrated at the changed frequency, the wearable device 3 is vibrated as illustrated in FIG. 3C. The vibration of the changed frequency is delivered to the left hand 4 on which the wearable device 3 is worn.

The vibration frequency of the second vibration source 331 corresponds to the number of pages on the finger bookmark. The correspondence between the vibration frequency and the number of pages on the finger bookmark may be appropriately adjusted. For example, as illustrated in FIG. 4C, the vibration frequency of the second vibration source 331 may be proportional to the number of pages on the finger bookmark. Without being limited to this, the vibration frequency of the second vibration source 331 may be increased step by step for each predetermined number of pages on the finger bookmark. In this case, the vibration frequency may be divided into, for example, 5 or 6 steps according to the sensitivity of the human to stimulation of vibration.

(4) Release of Finger Bookmark

When the operator wishes to return to a page of interest, the operator performs an operation of releasing the finger bookmark. The finger bookmark releasing operation is a reverse operation to the finger bookmarking operation, that is, an operation by the operator of touching a predetermined area on the operation display 22 with the thumb 40 of the left hand 4 and sliding the thumb 40 downward so as to draw an arc.

When the operator performs the finger bookmark releasing operation, the bookmarking operation detector 202 detects the finger bookmark releasing operation and the bookmark processing unit 203 outputs the page number of the mark page to the display unit 200. The display unit 200 displays a page of a page number output from the bookmark processing unit 203 on the display screen 22a of the operation display 22.

First Modification

In the first exemplary embodiment, the vibration of the second vibration source 331 is started at time $T_2$. However, the present invention is not limited thereto. For example, the vibration frequency of the second vibration source 331 may be changed immediately after the start of the turning operation, during the turning operation, or immediately before the end of the turning operation. Specifically, the second vibration source 331 may be vibrated at a predetermined frequency immediately after the start of the turning operation, the predetermined frequency may be changed during the turning operation to a higher frequency than that immediately after the start of the turning operation, and the higher frequency may be changed immediately before the end of the turning operation to a lower frequency than that during the turning operation.

Second Modification

It has been illustrated in the first exemplary embodiment that the operator uses the finger bookmark to perform the turning operation. It will be illustrated in a second modification that the turning operation is performed without using the finger bookmark. Hereinafter, description will be given with focusing on differences from the first exemplary embodiment.

In the case where the finger bookmark is not used, for example, when the turning operation detector 204 detects the turning operation, the vibration controller 201 may transmit an operation command signal to the first vibration unit 23 for a predetermined time (for example, several seconds) in order to vibrate the first vibration source 231 at a predetermined frequency for the predetermined time.

When the turning operation detector 204 detects the end of the turning operation, the vibration controller 201 may transmit an operation command signal to the wearable device 3 and the controller 30 may transmit an operation command signal to the second vibration unit 33 for a predetermined time (for example, several seconds) based on the operation command signal transmitted from the vibration controller 201 in order to vibrate the second vibration source 331 at a predetermined frequency for the predetermined time.

As described above, the information processing apparatus 2 may be vibrated when the operator performs the turning operation, and the wearable device 3 may be vibrated when the operator ends the turning operation.

In this case, determination on whether or not the finger bookmark is being used may be made, for example, by storing information for identifying whether or not the finger bookmark is working as bookmark data 212 in the memory 21 and by the bookmark processing unit 203 reading this bookmark data 212.

Second Exemplary Embodiment

FIG. 6 is a block diagram illustrating an example of a control system of an information processing system according to a second exemplary embodiment of the present invention. The operation of turning a page of a document has been illustrated in the first exemplary embodiment. An operation of moving a document will be described in the second exemplary embodiment. Hereinafter, description will be given with focusing on differences from the first exemplary embodiment.

In the second exemplary embodiment, for the convenience of explanation, a case where the operator wears the wearable device 3 on the left hand and the information processing apparatus 2 is operated with this left hand will be described as a non-limiting example.

As illustrated in FIG. 6, the controller 20 of the information processing apparatus 2 operates in accordance with the program 210 to function as a display unit 200, a vibration controller 201, a bookmarking operation detector 202, a bookmark processing unit 203, a document moving operation detector 206, a document movement processing unit 207, and the like.

The document moving operation detector 206 detects an operation of moving the document 220 (hereinafter, simply referred to as a "document moving operation") performed by the operator on the document 220 displayed on the display screen 22a. The document moving operation is an operation by the operator of moving a display position of the document 220 on the display screen 22a and is another example of the first operation of changing the display position of the document 220. Further, the document moving operation detector 206 detects the end of the document moving operation performed by the operator.

When the document moving operation detector 206 detects the document moving operation, the document movement processing unit 207 generates image information of the moving document 220 and dynamically outputs the generated image information to the display unit 200.

(Operation of Second Exemplary Embodiment)

Figure 7A:
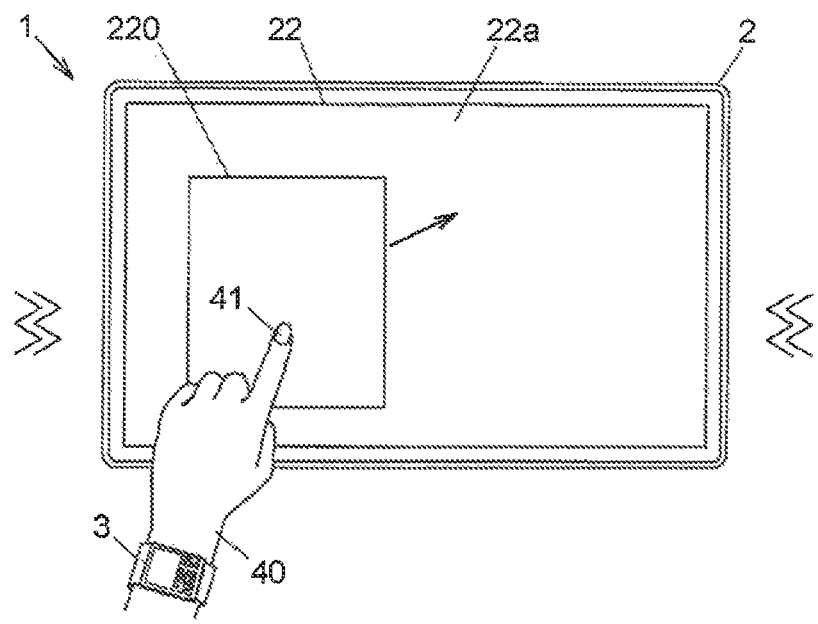
FIGS. 7A and 7B are views illustrating an example of an operation on a document in the information processing system illustrated in FIG. 6.
Figure 7B:
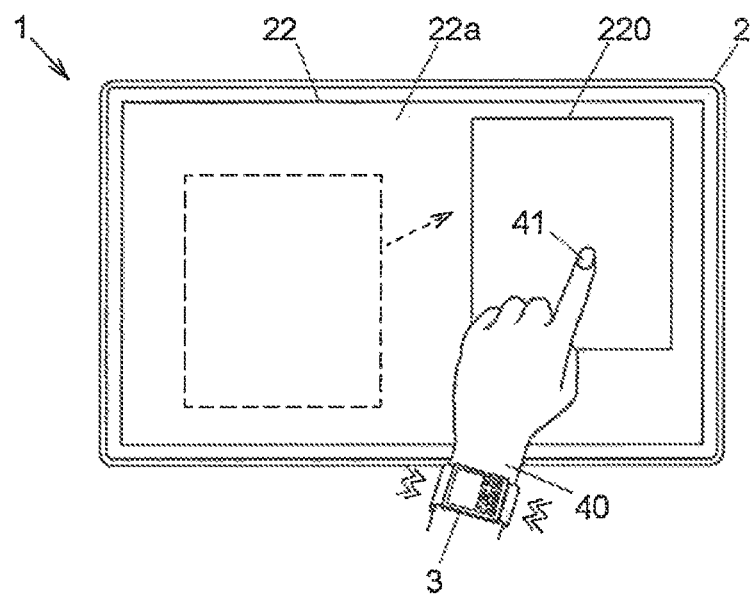
Figure 8:
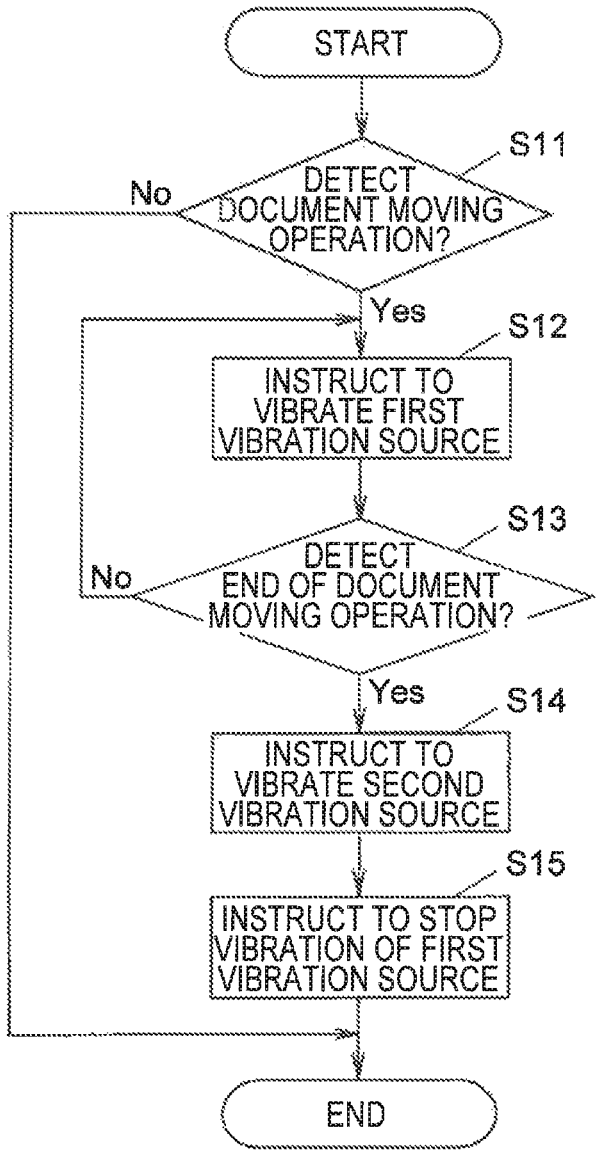
FIG. 8 is a flowchart illustrating an example of an operation of the information processing apparatus system illustrated in FIG. 6.

Next, an example of the operation of the information processing system 1 according to the second exemplary embodiment will be described with reference to FIGS. 7A, 7B and FIG. 8. FIGS. 7A and 7B are views illustrating an example of an operation on a document in the information processing system illustrated in FIG. 6. FIG. 7A illustrates a state in which a document is being moved and FIG. 7B illustrates a state immediately after the movement of the document is completed. In FIG. 7B, a broken line frame indicates a document position before the movement and a broken line arrow indicates a document moving path. FIG. 8 is a flowchart illustrating an example of an operation of the information processing apparatus system illustrated in FIG. 6. The following description will be focused on an operation performed after the operator performs a finger bookmarking operation on a page of interest and an operation performed by the information processing system 1 corresponding to this earlier operation. Explanation of the contents such as the finger bookmarking operation described in the first exemplary embodiment will not be repeated for the purpose of brevity.

(1) Document Moving Operation

The operator performs a finger bookmarking operation on a page of interest and then moves the document 220 on the display screen 22a. The document 220 is moved, for example, when the operator touches an arbitrary area of the displayed document 220 with the index finger 41 of the left hand 4 on which the wearable device 3 is worn, and moves the index finger 41 with touching an arbitrary position on the display screen 22a.

When the operator performs the document moving operation, the document moving operation detector 206 detects the document moving operation ("Yes" in S11) and the document movement processing unit 207 generates image information of the document 220 being moved according to the sliding of the index finger 41 and dynamically outputs the generated image information to the display unit 200.

As illustrated in FIG. 7A, the display unit 200 displays the moving document 220 on the display screen 22a of the operation display 22 based on the image information output from the document movement processing unit 207 (see, for example, an arrow in FIG. 7A).

In addition, when the document moving operation detector 206 detects the document moving operation ("Yes" in S11), the vibration controller 201 transmits an operation command signal to the first vibration unit 23, as an instruction to vibrate the first vibration source 231 (S12).

The first vibration source 231 is vibrated at a predetermined frequency according to a drive signal output from the driver IC 230 based on the operation command signal transmitted from the vibration controller 201. As the first vibration source 231 is vibrated, the entire information processing apparatus 2 is vibrated as illustrated in FIG. 7A. This vibration is delivered to the left hand 4 touching the display screen 22a by the operator during operation.

The document moving operation described above may move plural documents at the same time. In this case, the vibration frequency may correspond to the number of documents 220. For example, when two wearable devices are respectively worn on both hands, the wearable device worn on one hand may be vibrated at a first frequency for document movement performed by the one hand, while the wearable device worn on the other hand may be vibrated at a second frequency for document movement performed by the other hand.

(2) End of Document Moving Operation

The operator moves the document 220 to an intended position and ends the operation of moving the document 220. The document moving operation is ended, for example, when the movement of the index finger 41 touching the display screen 22a is stopped or when the index finger 41 is detached from the display screen 22a.

When the operator ends the document moving operation, the document moving operation detector 206 detects the end of the document moving operation ("Yes" in S13), the vibration controller 201 transmits an operation command signal, as an instruction to vibrate the second vibration source 331, to the controller 30 of the wearable device 3 via the wireless communication units 24 and 34, and the controller 30 transmits the operation command signal to the second vibration unit 33 (S14). At the same time, as an instruction to stop the vibration of the first vibration source 231, the vibration controller 201 stops the transmission of the operation command signal to the first vibration unit 23 (S15).

The second vibration source 331 is vibrated at a predetermined frequency according to the drive signal output from the driver IC 330 based on the operation command signal transmitted from the controller 30. As the second vibration source 331 is vibrated, the wearable device 3 is vibrated as illustrated in FIG. 7B. This vibration is delivered to the left hand 4 on which the wearable device 3 is worn.

At the same time, the first vibration source 231 stops the vibration by stopping the output of the drive signal from the driver IC 230 based on the stop of the transmission of the operation command signal from the vibration controller 201. As a result, as illustrated in FIG. 7B, the vibration of the entire information processing apparatus 2 is stopped.

Modification

In the second exemplary embodiment, as in the first exemplary embodiment, the turning operation detector 204 may be provided in the controller 20, a step of turning operation is added to the processing flow, and the step of turning operation may be performed by the operator before the document moving operation after the bookmarking operation. In this case, the vibration frequency of the second vibration source 331 may correspond to the number of pages on the finger bookmark.

Third Exemplary Embodiment

Figure 9:
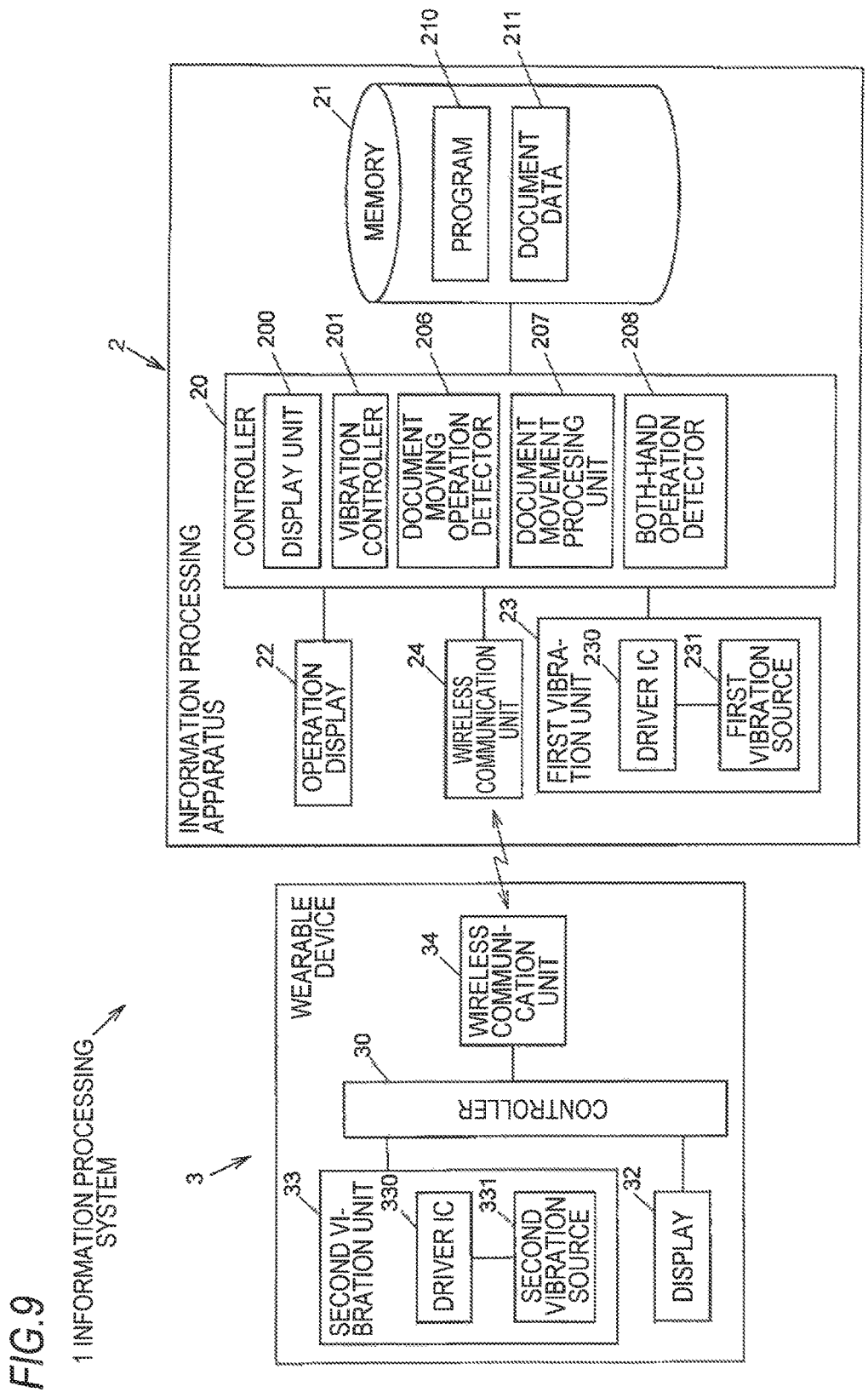
FIG. 9 is a block diagram illustrating an example of a control system of an information processing system according to a third exemplary embodiment of the present invention.

FIG. 9 is a block diagram illustrating an example of a control system of an information processing system according to a third exemplary embodiment of the present invention. It has been illustrated in the second exemplary embodiment that the operator moves the single document 220 with one hand on which the wearable device 3 is worn. An operation of moving plural documents 220 with both hands will be described in the third exemplary embodiment. Hereinafter, description will be given with focusing on differences from the second exemplary embodiment.

In the third exemplary embodiment, as an example, in a superimposing state (hereinafter, also referred to as "aggregates") where plural documents are superimposed by an operation of the operator, when the documents are respectively displayed on two different display areas, the aggregates are separately moved with one hand on which the wearable device 3 is worn and the other hand on which the wearable device 3 is not worn. For the convenience of explanation, it is assumed that the wearable device 3 is worn on the left hand 4, but the present invention is not limited thereto.

The controller 20 of the information processing apparatus 2 operates in accordance with the program 210 to function as a display unit 200, a vibration controller 201, a document moving operation detector 206, a document movement processing unit 207, a both-hand operation detector 208, and the like.

The memory 21 stores a program 210 according to the third exemplary embodiment and various data such as document data 211.

In addition to the functions described in the second exemplary embodiment, when the operator consolidates plural documents 220 into two aggregates, the document movement processing unit 207 stores in the memory 21 the number of documents 220 included in the two aggregates. Further, the document movement processing unit 207 reads the number of documents 220 included in the two aggregates and stored in the memory 21, and obtains a difference between the number of documents 220 included in one aggregate and the number of documents 220 included in the other aggregate.

The both-hand operation detector 208 detects an operation by both hands performed by the operator on the plural documents 220 displayed on the display screen 22a.

Figure 10A:
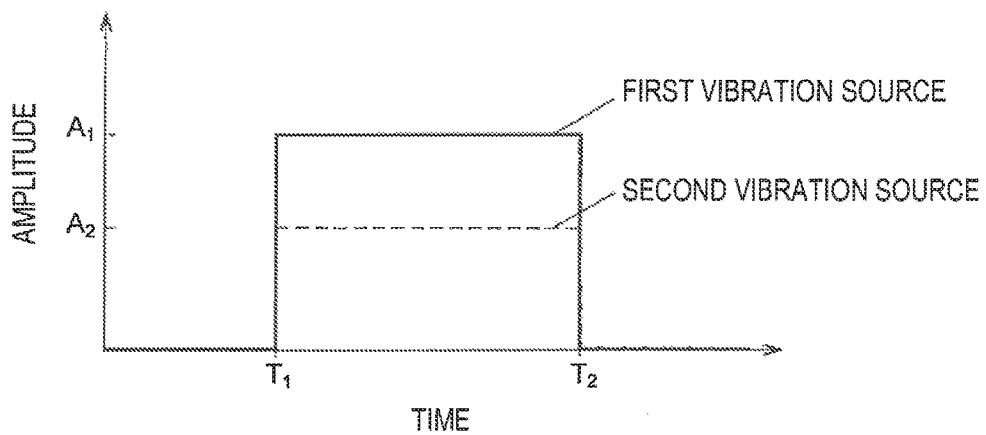
FIGS. 10A to 10C are timing charts illustrating an example of vibration of a vibration source of an information processing apparatus and a wearable device illustrated in FIG. 9.
Figure 10B:
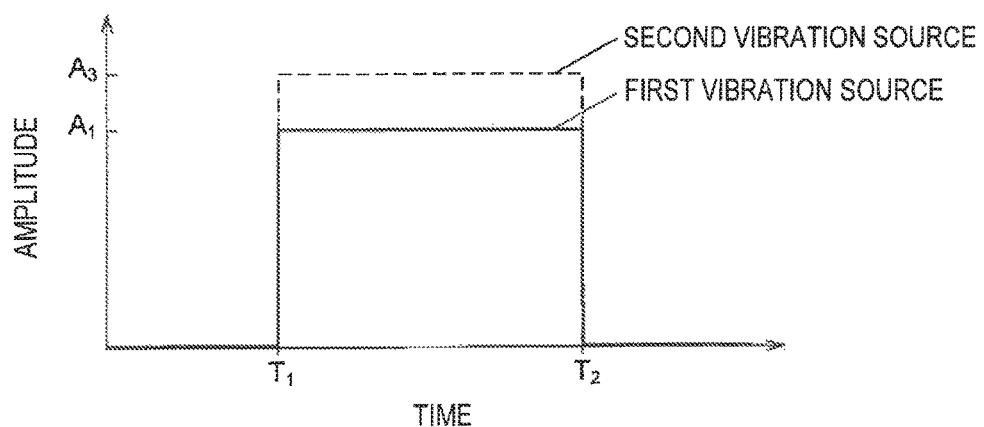
Figure 10C:
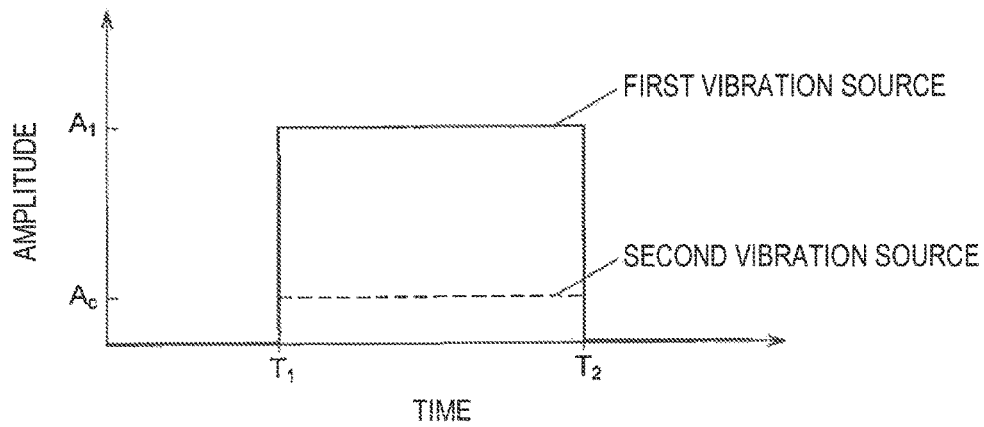

FIGS. 10A to 10C are timing charts illustrating an example of the amplitude of vibration of the vibration source of the information processing apparatus illustrated in FIG. 9 and the amplitude of vibration of the wearable device illustrated in FIG. 9. FIGS. 10A to 10C illustrate cases where the number of documents moved by manipulation of a hand on which the wearable device 3 is worn is smaller than, is larger than, and is equal to the number of documents moved by manipulation of a hand on which the wearable device 3 is not worn, respectively. In FIGS. 10A to 10C, the horizontal axis represents time and the vertical axis represents the amplitude of vibration. Time $T_1$ denotes time at which the both-hand operation detector 208 detects a document moving operation by each hand and time $T_2$ denotes time at which the both-hand operation detector 208 detects the end of the document moving operation by each hand. In other words, a period between time $T_1$ and time $T_2$ refers to a period during which the operation of moving the document 220 is performed by the operator.

The vibration controller 201 transmits an operation command signal to the first vibration unit 23 in order to vibrate the first vibration source 231 with predetermined amplitude $A_1$ (a fixed value). Further, the vibration controller 201 transmits, to the controller 30 of the wearable device 3, an amplitude change command signal for changing the amplitude of vibration of the second vibration source 331, based on a difference between the number of documents moved by manipulation of the hand on which the wearable device 3 is worn and the number of documents moved by manipulation of the hand on which the wearable device 3 is not worn. This difference is obtained by the document movement processing unit 207. A change in amplitude of vibration includes an increase (hereinafter, also referred to as "amplification") and a decrease (hereinafter, also referred to as "attenuation") in amplitude. When amplification and attenuation are distinguished from each other for the amplitude change command signal, a signal for amplification is referred to as an amplification command signal and a signal for attenuation is referred to as an attenuation command signal.

Specifically, as illustrated in FIG. 10A, when the number of documents moved by manipulation of the hand on which the wearable device 3 is worn is smaller than the number of documents moved by manipulation of the hand on which the wearable device 3 is not worn, the second vibration source 331 is vibrated with amplitude $A_2$ smaller than the amplitude $A_1$ of vibration of the first vibration source 231 during the period from time $T_1$ to time $T_2$.

In addition, as illustrated in FIG. 10B, when the number of documents moved by manipulation of the hand on which the wearable device 3 is worn is larger than the number of documents moved by manipulation of the hand on which the wearable device 3 is not worn, the second vibration source 331 is vibrated with amplitude $A_3$ larger than the amplitude $A_1$ of vibration of the first vibration source 231 during the period from time $T_1$ to time $T_2$.

Further, as illustrated in FIG. 10C, when the number of documents moved by manipulation of the hand on which the wearable device 3 is worn is equal to the number of documents moved by manipulation of the hand on which the wearable device 3 is not worn, the second vibration source 331 is vibrated with predetermined amplitude $A_c$ smaller than the amplitude $A_1$ of vibration of the first vibration source 231 during the period from time $T_1$ to time $T_2$.

The correspondence between a difference between the vibration amplitude of the second vibration source 331 and the vibration amplitude of the first vibration source 231 and the difference between the number of documents moved by manipulation of the hand on which the wearable device 3 is worn and the number of documents moved by manipulation of the hand on which the wearable device 3 is not worn may be appropriately adjusted. For example, the difference between the vibration amplitude of the first vibration source 231 and the vibration amplitude of the second vibration source 331 may be proportional to the difference between the number of documents moved by manipulation of the hand on which the wearable device 3 is worn and the number of documents moved by manipulation of the hand on which the wearable device 3 is not worn.

The vibration amplitude of the second vibration source 331 is changed, for example, by superimposing a vibration having the same phase as or the reverse phase to the vibration of the first vibration source 231 on the vibration of the second vibration source 331. Specifically, the vibration of the second vibration source 331 is amplified by superimposing a vibration having the same phase as the vibration of the first vibration source 231 on the vibration of the second vibration source 331 and is attenuated by superimposing a vibration having the reverse phase to the vibration of the first vibration source 231 on the vibration of the second vibration source 331.

(Operation of Third Exemplary Embodiment)

Figure 11:
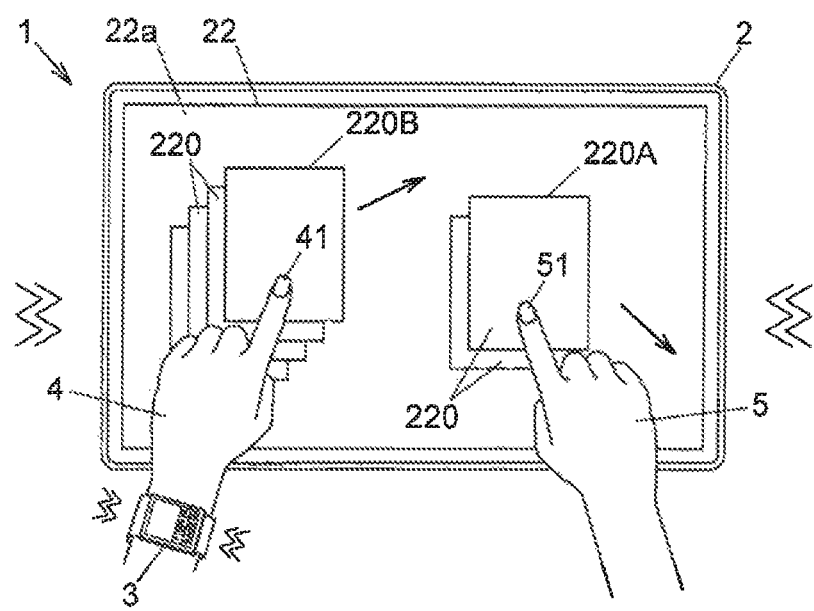
FIG. 11 is a view illustrating an example of an operation on a document in the information processing system illustrated in FIG. 9.
Figure 12:
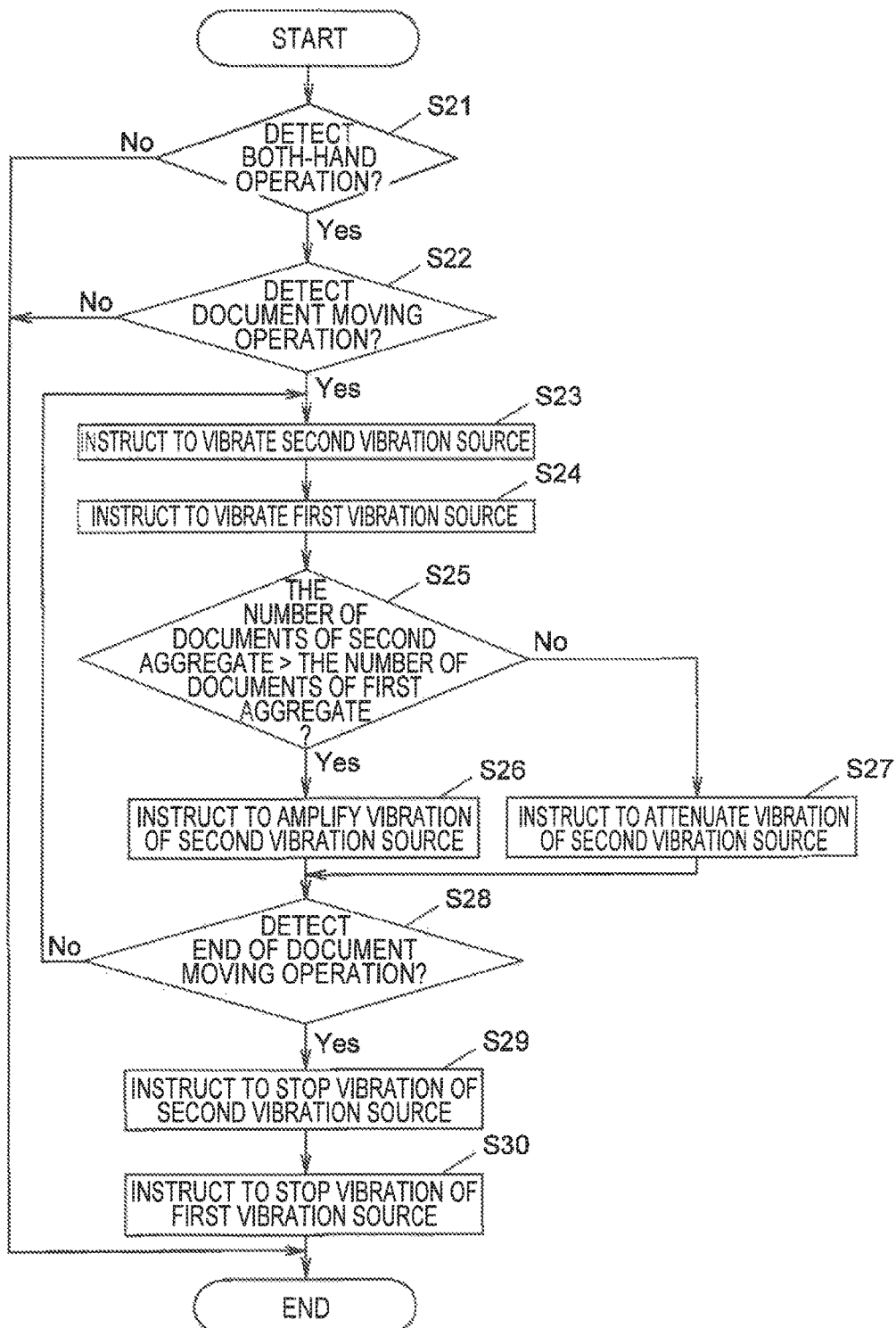
FIG. 12 is a flowchart illustrating an example of the operation of the information processing apparatus system illustrated in FIG. 9.

Next, an example of the operation of the information processing system 1 according to the third exemplary embodiment will be described with reference to FIGS. 11 and 12. FIG. 11 is a view illustrating an example of the operation of the document 220 of the information processing system illustrated in FIG. 9. FIG. 12 is a flowchart illustrating an example of the operation of the information processing apparatus system illustrated in FIG. 9.

When the operator selects plural documents 220, the display unit 200 reads the plural pieces of document data 211 selected by the operator and displays the read plural document data on the display screen 22a.

As illustrated in FIG. 11, the operator consolidates the plural documents 220 in two aggregates 220A and 220B.

The consolidation of the plural documents 220 into the aggregates 220A and 220B is achieved, for example, by using the document moving operation described in the second exemplary embodiment to move the individual documents 220 to respective predetermined ranges on the display screen 22a.

The document moving operation detector 206 detects the operation by the operator of consolidating the plural documents 220 into the two aggregates 220A and 220B. Then, upon detecting this document consolidating operation, the document moving operation detector 206 stores the number of documents 220 included in each of the aggregates 220A and 220B, as the document data 211, in the memory 21.

Next, the operator moves one of the two aggregates 220A and 220B, which is relatively displayed on the right side of the display screen 22a (hereinafter, also referred to as a "first aggregate 220A"), with the index finger 51 of the right hand 5, and moves the other aggregate 220B (hereinafter, also referred to as a "second aggregate 220B") with the index finger 41 of the left hand 4.

Hereinafter, description will be made using the flowchart of FIG. 12.

An operation with both hands is detected, for example, when the operator touches an arbitrary area within a range where the first aggregate 220A is displayed and an arbitrary area of the displayed second aggregate 220B, with his/her fingers, respectively. In order to distinguish the operation with both hands from a case of touching with plural fingers of one hand, for example, when two points touched by fingers have a predetermined distance therebetween, it may be detected that an operation with both hands is performed.

When the operator performs the document moving operation with both hands, the both-hand operation detector 208 detects the operation of both hands ("Yes" in S21) and the document moving operation detector 206 detects the document moving operation performed by the operator ("Yes" in S22).

When the document moving operation detector 206 detects the document moving operation ("Yes" in S22), the vibration controller 201 transmits an operation command signal, as an instruction to vibrate the second vibration source 331, to the controller 30 of the wearable device 3 via the wireless communication units 24 and 34 (S23) and transmits an operation command signal, as an instruction to vibrate the first vibration source 231, to the first vibration unit 23 (S24). The controller 30 receives the operation command signal transmitted from the vibration controller 201 and transmits the operation command signal to the second vibration unit 33.

The first vibration source 231 is vibrated with predetermined amplitude $A_1$ according to a drive signal output from the driver IC 230 based on the operation command signal transmitted from the vibration controller 201. The second vibration source 331 is vibrated with the predetermined amplitude $A_1$ according to a drive signal output from the driver IC 330 based on the operation command signal transmitted from the controller 30.

The document movement processing unit 207 reads the number of documents 220 included in the first aggregate 220A and stored in the memory 21 and the number of documents 220 included in the second aggregate 220B, and compares the number of documents 220 included in the second aggregate 220B with the number of documents 220 included in the first aggregate 220A (S25).

When the document movement processing unit 207 determines that the number of documents 220 included in the second aggregate 220B is larger than the number of documents 220 included in the first aggregate 220A ("Yes" in S25), the vibration controller 201 transmits an amplification command signal for amplifying the vibration of the second vibration source 331, as an instruction to amplify the vibration of the second vibration source 331, to the controller 30 of the wearable device 3 via the wireless communication units 24 and 34 (S26). The controller 30 receives the amplification command signal transmitted from the vibration controller 201 and transmits the amplification command signal for amplifying the vibration to the second vibration unit 33.

In the meantime, when the document movement processing unit 207 determines that the number of documents 220 included in the second aggregate 220B is not larger than the number of documents 220 included in the first aggregate 220A ("No" in S25), the vibration controller 201 transmits an attenuation command signal for attenuating the vibration of the second vibration source 331, as an instruction to attenuate the vibration of the second vibration source 331, to the controller 30 of the wearable device 3 via the wireless communication units 24 and 34 (S27). The controller 30 receives the attenuation command signal transmitted from the vibration controller 201 and transmits the attenuation command signal for attenuating the vibration to the second vibration unit 33.

The second vibration source 331 is vibrated with the vibration amplitude which is changed into a value corresponding to the difference between the number of documents 220 included in the first aggregate 220A and the number of documents 220 included in the second aggregate 220B, as described above, according to the drive signal output from the driver IC 330 based on the amplitude change command signal transmitted from the controller 30.

As the first vibration source 231 and the second vibration source 331 are vibrated with the above-mentioned vibration amplitude, the information processing apparatus 2 and the wearable device 3 are vibrated with the above-mentioned vibration amplitude, as illustrated in FIG. 11. The vibration of the information processing apparatus 2 is delivered to both the left hand 4 and the right hand 5 with which the operator touches the display screen 22a during operation. The vibration of the wearable device 3 is delivered to the left hand 4.

Next, the operator moves the first aggregate 220A and the second aggregate 220B to an intended position and ends the document moving operation. The document moving operation detector 206 detects the end of the document moving operation performed by the operator (S28).

When the document moving operation detector 206 detects the end of the operation of moving the first aggregate 220A and the second aggregate 220B ("Yes" in S28), the vibration controller 201 transmits an operation stop command signal, as an instruction to stop the vibration of the second vibration source 331, to the controller 30 of the wearable device 3 via the wireless communication units 24 and 34. The controller 30 stops the transmission of the operation command signal to the second vibration unit 33 based on the operation stop command signal transmitted from the vibration controller 201 (S29). At the same time, as an instruction to stop the vibration of the first vibration source 231, the vibration controller 201 stops the transmission of the operation command signal to the first vibration source 231 (S30).

The second vibration source 331 stops the vibration by stopping the output of the drive signal from the driver IC 330 based on the stop of the transmission of the operation command signal from the controller 30. As a result, the vibration of the wearable device 3 is stopped.

In addition, the first vibration source 231 stops the vibration by stopping the output of the drive signal from the driver IC 230 based on the stop of the transmission of the operation command signal from the vibration controller 201. As a result, the vibration of the entire information processing apparatus 2 is stopped.

Although it has been illustrated that the wearable device 3 is worn on the left hand 4, the wearable device 3 may be worn on the right hand 5. More specifically, the both-hand operation detector 208 receives information as to which hand the wearable device 3 is worn on (hereinafter, also referred to as "wearing information"). Based on this wearing information, the above process when the wearable device 3 is worn on the left hand 4 and the above process when the wearable device 3 is worn on the right hand 5 may be exchanged.

Further, it has been illustrated in the above example that the operations with both hands are simultaneously ended, but only the operation with one hand may be ended. In this case, the vibration of the information processing apparatus 2 may be stopped when the operation with the right hand 5 is ended and the vibration of the wearable device 3 may be stopped when the operation with the left hand 4 is ended.

Although the exemplary embodiments of the present invention have been described above, the present invention is not limited to the above-described exemplary embodiments but other various modifications and implementations may be made without departing from the spirit and scope of the present invention. For example, when a document is displayed on a virtual screen and the motion of operator's hand is associated with the motion thereof on the virtual screen, plural vibration sources may be vibrated in response to an operation of the virtual screen.

Each part of the controller 20 may be partially or entirely implemented by a hardware circuit such as a reconfigurable circuit (for example, field programmable gate array (FPGA)) and application specific integrated circuit (ASIC).

In addition, some of the elements of the above exemplary embodiments may be omitted or modified without departing from the spirit and scope of the present invention. Further, steps may be added, deleted, changed, replaced, and the like in the flows of the above exemplary embodiment without departing from the spirit and scope of the present invention. Furthermore, the programs used in the above exemplary embodiments may be provided in the form of a computer-readable recording medium such as a CD-ROM or alternatively may be stored in an external server such as a cloud server and provided via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a display unit that displays a document on a display screen;
   a detector that detects an operation by an operator on the document displayed on the display screen;
   a plurality of vibration sources that deliver vibrations to different parts of the operator; and
   a vibration controller that performs control to selectively vibrate the plurality of vibration sources in accordance with contents of the operation detected by the detector,
   wherein the plurality of vibration sources include
      a first vibration source provided in an information processing apparatus having the display screen, and
      a second vibration source provided in a wearable device worn on the operator,
   wherein the vibration controller vibrates the first vibration source when a plurality of the documents are displayed in superimposing states at different display positions, respectively and when the detector detects an operation of moving a display position of a document in a first superimposing state among the documents in the superimposing states, and wherein the vibration controller vibrates the second vibration source when the plurality of documents are displayed in the superimposing states at the different display positions, respectively and when the detector detects an operation of moving a display position of a document in a second superimposing state among the documents in the superimposing states.

2. The information processing system according to claim 1, wherein
the operation detected by the detector includes a first operation of changing a display position of the document, and
the vibration controller
vibrates the first vibration source when the detector detects the first operation, and
vibrates the second vibration source when the detector detects an end of the first operation.

3. The information processing system according to claim 2, wherein the vibration controller stops the vibration of the first vibration source when the detector detects the end of the first operation.

4. The information processing system according to claim 2, wherein
the operation detected by the detector includes a second operation of instructing a display position of the document, and
the vibration controller vibrates the second vibration source at a vibration frequency corresponding to a difference between the display position instructed by the second operation and the display position at which the document is displayed on the display screen.

5. The information processing system according to claim 2, wherein the first operation includes an operation of moving the display position of the document on the display screen.

6. The information processing system according to claim 1, wherein
the operation detected by the detector includes a first operation of changing a display position of the document, and
the vibration controller
vibrates the first vibration source when the detector detects the first operation, and
gradually vibrates the second vibration source immediately before the detector detects an end of the first operation.

7. The information processing system according to claim 6, wherein the vibration controller stops the vibration of the first vibration source when the detector detects the end of the first operation.

8. The information processing system according to claim 1, wherein
the operation detected by the detector includes a first operation of changing a display position of the document, and
the vibration controller
vibrates the first vibration source when the detector detects the first operation,
vibrates the second vibration source at a predetermined frequency immediately after the detector detects the first operation,
changes a frequency of the second vibration source to a frequency higher than the predetermined frequency when the detector detects the first operation, and
changes the frequency of the second vibration source to a frequency lower than the higher frequency immediately before the detector detects an end of the first operation.

9. The information processing system according to claim 8, wherein the vibration controller stops the vibration of the first vibration source when the detector detects the end of the first operation.

10. The information processing system according to claim 1, wherein the vibration controller changes an amplitude of the vibration of the second vibration source based on a difference between the number of documents moved by the operation of moving the display position of the document in the first superimposing state and the number of documents moved by the operation of moving the display position of the document in the second superimposing state.

11. The information processing system according to claim 10, wherein the vibration controller changes the amplitude of the vibration to be delivered to the operator by superimposing the vibration of one of the first vibration source and the second vibration source on a vibration having an identical phase to or a reverse phase to the vibration of the other of the first vibration source and the second vibration source, based on the difference.

12. An information processing system comprising:
display means for displaying a document on a display screen;
detecting means for detecting an operation by an operator on the document displayed on the display screen;
a plurality of vibration means for delivering vibrations to different parts of the operator; and
vibration control means for performing control to selectively vibrate the plurality of vibration means in accordance with contents of the operation detected by the detecting means,
wherein the plurality of vibration means include
a first vibration means provided in an information processing apparatus having the display means, and
a second vibration means provided in a wearable device worn on the operator,
wherein the vibration control means vibrates the first vibration means when a plurality of the documents are displayed in superimposing states at different display positions, respectively and when the detecting means detects an operation of moving a display position of a document in a first superimposing state among the documents in the superimposing states, and
wherein the vibration control means vibrates the second vibration means when the plurality of documents are displayed in the superimposing states at the different display positions, respectively and when the detecting means detects an operation of moving a display position of a document in a second superimposing state among the documents in the superimposing states.

* * * * *